United States Patent [19]

Blomberg

[11] 4,235,316

[45] Nov. 25, 1980

[54] SENSOR FOR BRAKING SYSTEMS

[76] Inventor: Folke I. Blomberg, Duvstigen 4, S-181, 40 Lidingo, Sweden

[21] Appl. No.: 952,960

[22] Filed: Oct. 20, 1978

Related U.S. Application Data

[63] Continuation-in-part of Ser. No. 657,104, Feb. 11, 1976, Pat. No. 4,061,212, and Ser. No. 847,669, Nov. 1, 1977.

[30] Foreign Application Priority Data

Jan. 30, 1978 [SE] Sweden .............................. 7801119

[51] Int. Cl.² ............................................. B60T 8/16
[52] U.S. Cl. ............................ 188/181 R; 303/22 R; 310/168
[58] Field of Search ............ 188/181 A, 181 C, 181 R; 200/61.46; 303/22 R, 93, 95, 97, 113; 310/168

[56] References Cited
U.S. PATENT DOCUMENTS

| | | | |
|---|---|---|---|
| 3,908,805 | 9/1975 | Morse et al. .................... | 303/113 X |
| 3,953,691 | 4/1976 | Grosseau ..................... | 188/181 R X |
| 4,061,212 | 12/1977 | Blomberg ....................... | 188/181 A |

*Primary Examiner*—Duane A. Reger
*Attorney, Agent, or Firm*—Bell, Seltzer, Park & Gibson

[57] ABSTRACT

A sensor for responding to the rate of change of changing rotational speeds of a rotating vehicle wheel and including a flyweight coupleable for rotation in response to wheel rotation and decoupleable in response to a rate of change of a changing rotational speed of the wheel which exceeds a certain threshold rate. In accordance with the present invention, a brake device is operatively connected with the flyweight for constantly exerting on the flyweight a torque resisting rotation of the flyweight. Provision is made for signalling of any occurrence of an excessive rate of change of rotational speed of the wheel continuously for the interval of time during which a threshold rate is exceeded, and the brake device may be operable in response to such signalling for changing the level of torque exerted.

31 Claims, 13 Drawing Figures

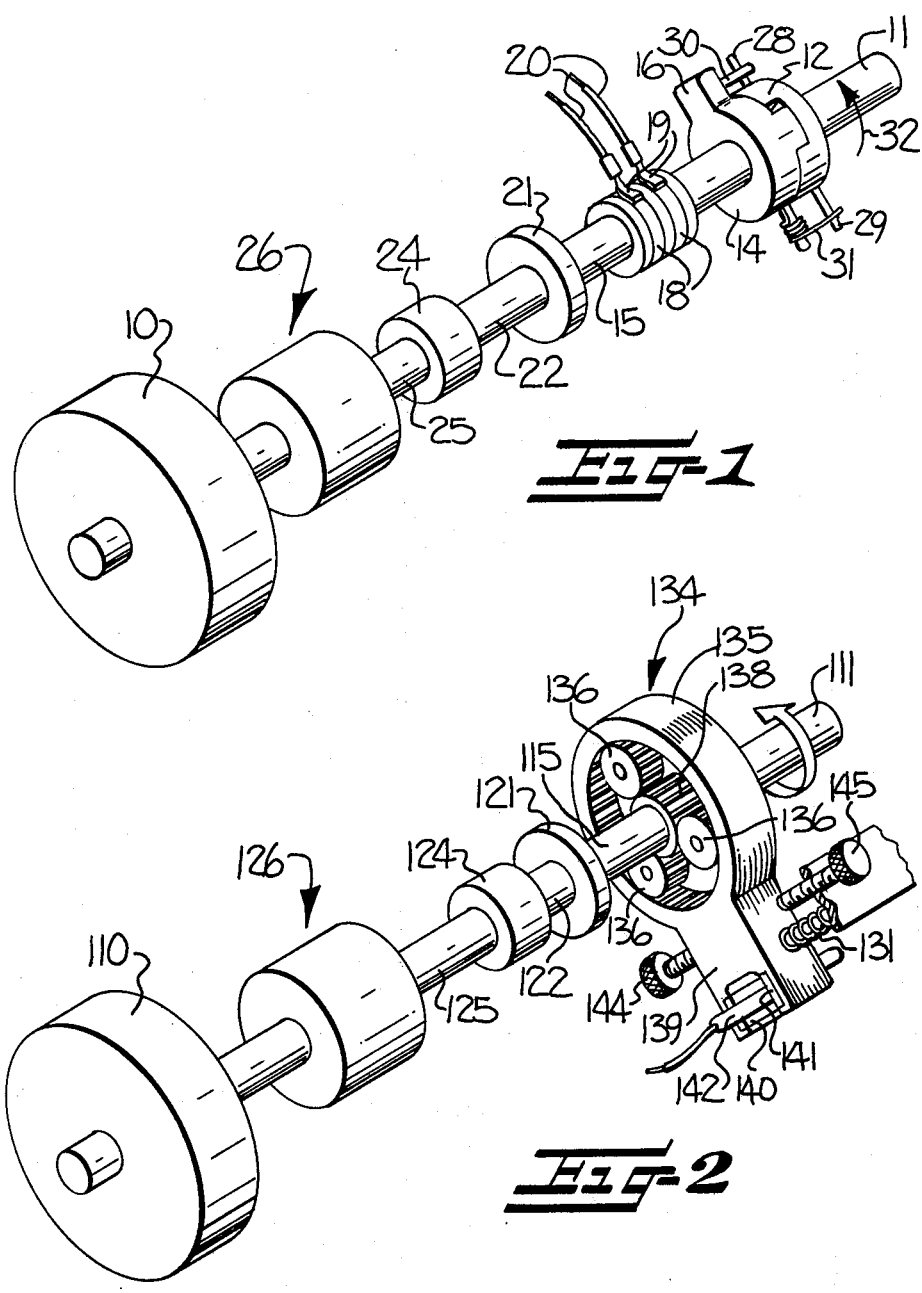

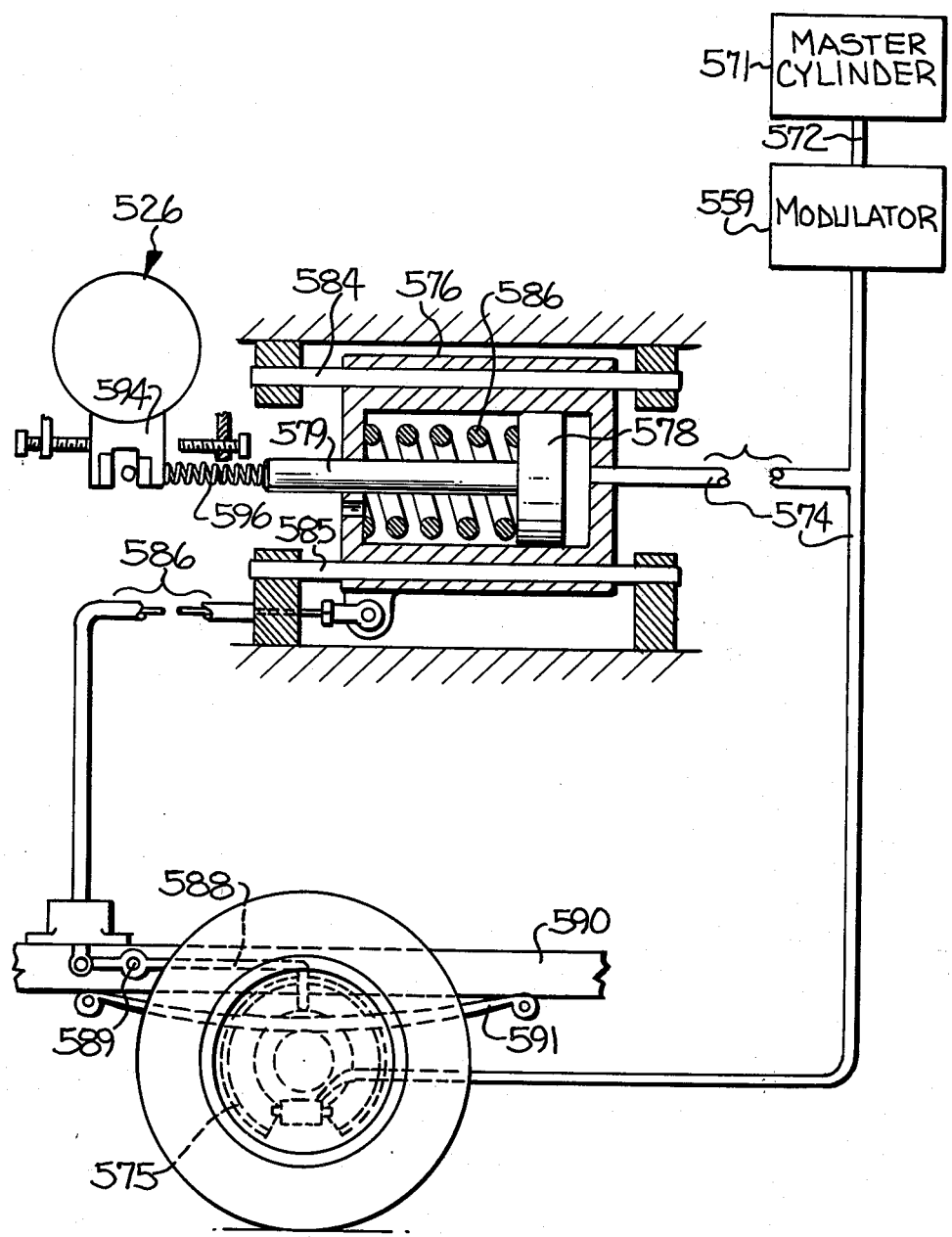

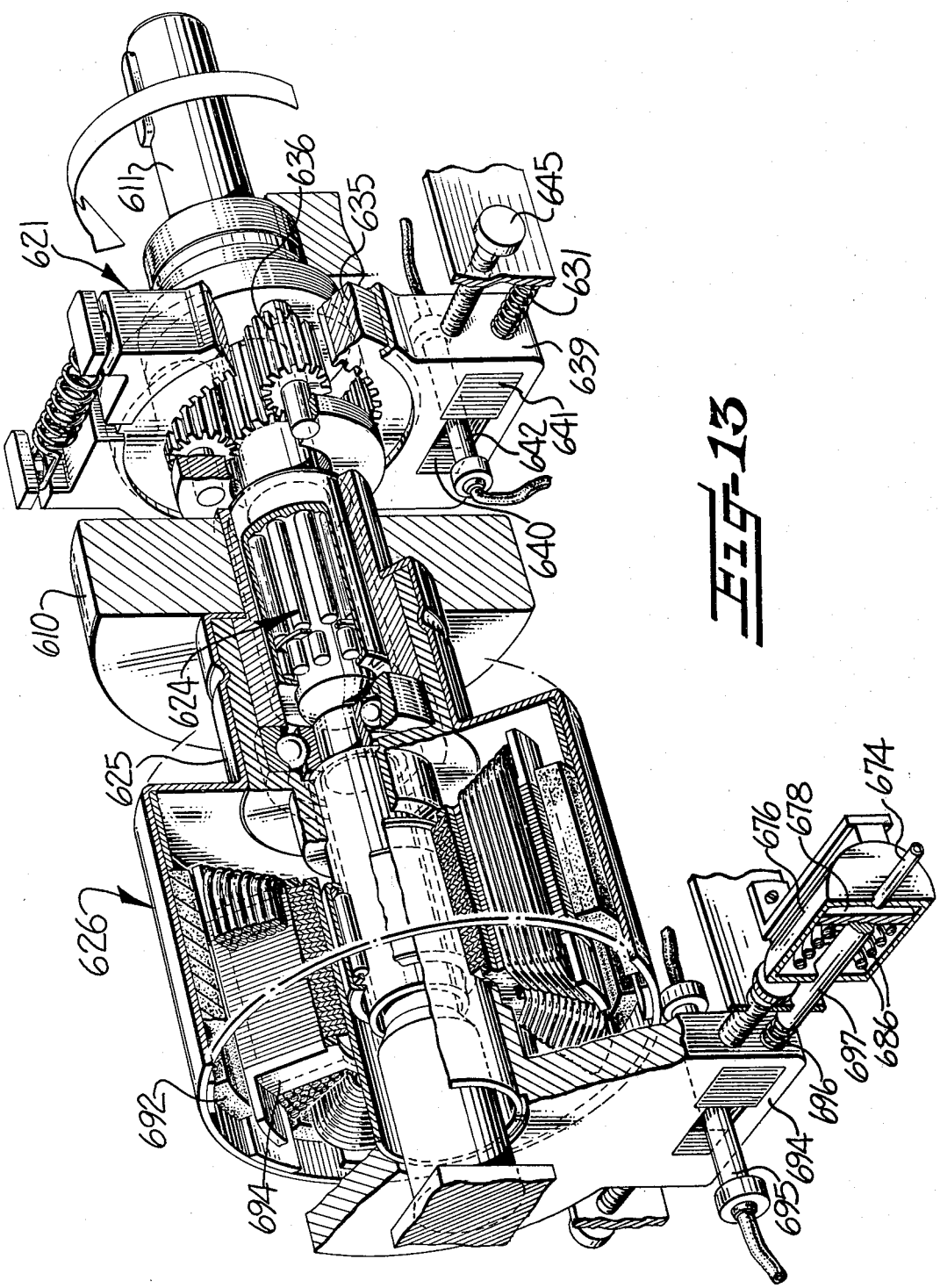

SENSOR FOR BRAKING SYSTEMS

This application is a continuation-in-part of earlier application Ser. No. 657,104 filed Feb. 11, 1976 and now U.S. Pat. No. 4,061,212 and of copending application Ser. No. 847,669 filed Nov. 1, 1977. Prior U.S. Pat. No. 4,061,212 is hereby incorporated by reference to any extent necessary to a full understanding of this application.

TECHNICAL FIELD AND BACKGROUND OF THE INVENTION

As is known to persons skilled in the art of braking rotation members such as automotive vehicle wheels, where brake modulators are used for varying the braking effect exerted, it is necessary to sense the rate of change of changing rotational speeds of a rotatable element. Other examples of such needs are known to persons skilled in the applicable arts. A variety of approaches to sensing rates of change of changing rotational speeds and/or vehicle wheel slip have been proposed heretofore, including certain prior sensors disclosed by the inventor of the sensor described hereinafter.

In connection with the development and use of sensors of the type briefly described hereinabove, one line of development has been directed to sensors having a flyweight coupleable for rotation in response to wheel rotation and decoupleable in response to the exertion on the flyweight of a torque arising due to a change in rotation of a vehicle wheel. In such sensors, it has now become known to provide a control means operatively connected with a flyweight for exerting thereon torques resisting decoupled rotation of the flyweight and a signalling means such as an electrical switch, which may preferably be of a magnetically actuated type, such as a reed switch or a Hall effect semiconductor, responsive to decoupled rotation of the flyweight for signalling occurrences of an excessive rate of change in changing rotational speeds of the wheel. Those forms of sensors which have achieved particular success in accommodating a wide range of vehicle operating conditions have done so, at least in part, by providing an improved control means capable of applying a torque which is an average of a plurality of different torques individually applied in a rapidly fluctuating series. Such sensors, while successful, may under certain operating circumstances and in certain systems require insertion of special electrical circuits or the use of other special components in order to accommodate generation of signals as a train of rapidly fluctuating pulses.

BRIEF SUMMARY OF THE INVENTION

With the above discussion in mind, it is an object of the present invention to accomplish proper operation of a sensor while simplifying certain characteristics of a system incorporating that sensor. In realizing this object of the present invention, a sensor of the general type described is improved by causing a torque to be exerted on a flyweight continuously or constantly during operation of the braking system. By such constant or continuous exertion of torque, the sensor structure is simplified and anticipated operating life extended.

Yet another object of the present invention is to accomplish more precise control over variations in the operating characteristics of a sensor. In realizing this object of the present invention, control means are provided and employed which open the possibility of more accurately controlling the responsiveness of a sensor in which torque is exerted on a flyweight.

BRIEF DESCRIPTION OF THE DRAWINGS

Some of the objects of the invention having been stated, other objects will appear as the description proceeds, when taken in connection with the accompanying drawings, in which—

FIG. 1 is a schematic perspective view of one form of sensor in accordance with the present invention and which is responsive to the rate of change of changing rotational speeds of a rotatable element;

FIG. 2 is a view similar to FIG. 1, showing a second form of sensor;

FIG. 12 is a view similar to FIGS. 8 and 9 showing an arrangement for varying the parameters of operation of the sensor of FIGS. 10 and 11; and FIG. 13 is a perspective view, partly broken away and partly in section, of an operating embodiment of one form of sensor in accordance with the present invention and which includes features of the sensor arrangements of FIGS. 10 and 12 including a non-contact drag device.

DETAILED DESCRIPTION OF THE INVENTION

Figure 3:
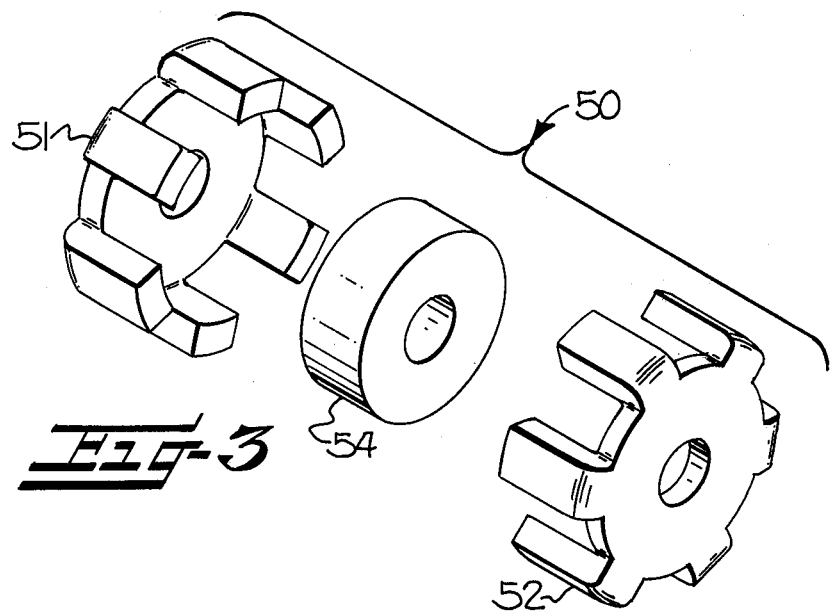
FIG. 3 is an exploded perspective view of certain components of a rotor used as one type of element in the sensor of FIGS. 1 and 2.

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

Referring now more particularly to the accompanying drawings, FIG. 1 shows a sensor for responding to the rate of change of changing rotational speeds of a rotating member such as a vehicle wheel. The sensor of FIG. 1 includes a flyweight 10 coupleable for rotation in response to wheel rotation by means of an input shaft 11. The flyweight 10 and shaft 11 are coupleable through means including claw coupling members 12, 14. One claw coupling member 14 is fixed to an intermediate shaft 15 and carries a switch housing 16 within which is mounted an electrical switch. An electrical circuit including the switch may be completed through a pair of slip rings 18, associated brushes 19 and conductors 20. The means coupleably connecting the shaft 11 and flyweight 10 further includes a torque limiting device generally indicated at 21, through which rotation is transmitted to an intermediate shaft 22. Torque limiting devices of various sorts are known generally to designers of mechanical devices and, accordingly, need not be here described in significant detail. Readers desiring further information concerning such devices are referred to appropriate technical literature, including previously granted patents. One example of such a device is to be found in Furlette et al U.S. Pat. No. 3,942,339 issued Mar. 9, 1976. The intermediate shaft 22 driven through the maximum torque coupling 21 is connected with components of a free wheel device 24 through which rotation is supplied to a flyweight shaft 25 to which the flyweight 10 is fixed. The free wheel device 24 may be of a type known generally to mechanical designers and, accoardingly, a full description of a specific device will not here be given. Interested readers are referred to appropriate technical publications, including prior patents.

Mounted for cooperating with the flyweight shaft 25 and flyweight 10 is a drag or brake device generally indicated at 26. The drag device 26 may take a number of different specific forms, as described more fully hereinafter, and generally may be of a noncontact type or a contact type. The function of the drag device 26 is to act as a portion of a control means effective for exerting torques on the flyweight 10, by constantly or continually exerting a torque resisting rotation of the flyweight 10 during at least certain intervals as pointed out more fully hereinafter.

It will be noted that one member 12 of the claw coupling is provided with a pair of radially extending pins 28, 29. One pin 28 cooperates with an actuating arm 30 for the electrical switch mounted within the housing 16 on the other claw member 14. The other pin 29 extending radially from the one claw member 12 cooperates with a spring 31 which normally urges the two claw members 12, 14 into a particular engaging relationship. The torque exerted between the claw coupling members 12, 14 by the spring 31 is less than the torque exerted by the drag device 26 and is directed in such a way as to tend to turn the intermediate shaft claw member 14 in the direction in relation to the input shaft claw member 12 indicated by an arrow 32. The engagement of the claw coupling members 12, 14 is such as to provide a limited degree of freedom of relative rotation therebetween, which relative rotation cooperates to switch the electrical switch within the housing 16 from one conductive state to another by the interaction of the cooperating radial pin 28 and switch actuating arm 30.

More particularly, the free wheel device 24 is so arranged between the flyweight shaft 25 and intermediate shaft 22 that the flyweight shaft 25 and flyweight 10 can be turned freely in the direction of the arrow 32 in relation to the intermediate shafts 22, 15 and the input or drive shaft 11. Inasmuch as the sensor of FIG. 1 is intended to be a retardation sensor, it is illustrated with the claw coupling members 12, 14 in the relative positions occupied during normal operation and with the electrical switch in an open circuit condition, as where the torque exerted by the drag device 26 exceeds the torque exerted between the claw coupling members 12, 14 by the spring 31. In the event that the input shaft 11 is subjected to a rate of retardation greater than a rate determined, according to mechanical laws, by the torque exerted by the drag device 26 and the combined moments of inertia of the flyweight shaft 25, such portions of the free wheel device 24 as are joined thereto, such portions of the drag device 26 rotating therewith and the flyweight 10; then the flyweight shaft 25 and the parts rotating with that shaft will begin to rotate faster than other parts of the sensor. With such disengagement of the flyweight shaft 25 from the intermediate shafts 22, 15, the torque of the drag device 26 no longer acts upon the claw coupling formed by the claw coupling members 12, 14. The torque exerted by the spring 31 then will cause relative rotational movement between the claw coupling members 12, 14 and the electrical switch will be closed to signal to associated electrical circuitry that a predetermined rate of retardation has been exceeded. As will be understood from reference to FIG. 1, such relative rotational movement between the claw coupling members 12, 14 does not result in or cause disengagement therebetween, but instead moves the members from an engagement in which one member 12 fixed to an input shaft 11 is driving the other member 14 (as illustrated in FIG. 1) to a position as if the other member 14 were driving the one member 12. The alternate position is not illustrated in FIG. 1, but is believed to be clear from the above discussion.

Referring now more particularly to FIG. 2, a sensor there shown for responding to the rate of change of changing rotational speeds of a rotating member such as a vehicle wheel has a number of components comparable to those described hereinabove with reference to the sensor of FIG. 1. Where common components are used, common reference characters of a 100 order series have been applied to elements shown in FIG. 2. The differences between the sensors of FIGS. 1 and 2 relate to the use of a planetary gearing generally indicated at 134 and having an orbit gear 135, planet gears 136, and a sun gear 138. The sun gear 138 preferably is formed integrally with the intermediate shaft 115, with the input or drive shaft 111 being operatively connected to the planet gears 136 fomagnet carrier 139 mounting a pair of permanent magnets 140, 141. A reed switch 142 is positioned between the counteracting pair of permanent magnets 140, 141. The scope of movement of the orbit gear 135 and magnet carrier 139 is limited by an opposing pair of adjustment screws 144, 145 and a control spring 131 acts on the magnet carrier 139 to normally urge the orbit gear 135 into a predetermined rotational position. In the event that the input shaft 111 is subjected to a rate of retardation which is greater than a threshold rate, the force exerted by the spring 131 is overcome and the projecting magnet carrier 139 will turn. The permanent magnets 140, 141 are thus moved to such a position that the conductive state of the reed switch 142 is changed.

The planetary gear 134 in the sensor according to FIG. 2 thus serves the dual functions of providing an upgearing effect for the rotational speed of the input shaft 111 as transmitted to the intermediate shafts 115, 122 and a switch actuating function as is accomplished by the claw coupling members 12, 14 of the sensor according to FIG. 1. By using a planetary gearing 134, the sensor can be built with reduced dimensions as the flyweight can be made physically smaller while maintaining desired inertial effects due to the squaring effect of an increased or upgeared rotational speed. The use of the planetary gearing arrangement of FIG. 2 also avoids the need for slip rings 18 and brushes 19 as provided in FIG. 1.

The inclusion in the control means cooperating with the flyweights 10, 110 of the sensors of FIGS. 1 and 2 of the drag devices 26, 126 accomplishes a number of desired objectives for sensors in accordance with the present invention. It is contemplated for the present invention that the drag devices 26, 126 may take a range of forms, which is one reason for the schematic representation of such a device in FIGS. 1 and 2. It is known, for example, that it is possible to obtain a drag or braking effect through the use of devices based upon various frictional contact arrangements, based upon various noncontacting arrangements relying upon electrical and/or magnetic phenomena, and based upon principles drawing partly from contact and partly from noncontact arrangements. One arrangement may rely upon magnetic powder brakes wherein grains of a powdered magnetic material fill a gap between two relatively rotating, symetrical elements, giving rise to frictional resistance between the rotating elements upon imposition of a magnetic field tending to coalesce the magnetic particles. Such magnetic powder devices are well known both commercially and from prior patents, being shown for example in Rabinow U.S. Pat. No. 2,575,360 issued Nov. 20, 1951; Lear et al U.S. Pat. No. 2,705,064 issued Mar. 29, 1955; Searle U.S. Pat. Nos. 3,394,783 and 3,394,784 issued July 30, 1968; Adkins U.S. Pat. No. 3,450,238 issued June 17, 1969 and the commercially available catalogs issued by businesses holding interests in those patents. Another suitable device is a hysteresis brake. Both of these devices may exert torques which are independent of speed. Other arrangements may include eddy current brakes and the like. The last mentioned arrangements require, however, electrical power supply which varies in predetermined relation with the rotational speeds of the elements and may, under certain operating conditions, impose unacceptably high requirements.

It is contemplated that more conventional frictional drag devices or brakes may be used, provided that the device chosen is of a type which is substantially independent of variations in coefficients of friction between the frictional surfaces. For instance, a brake structure employing a helically wound coil encircling a cooperating frictional surface such as those shown in parent Blomberg U.S. Pat. No. 4,061,212 may be used, wherein a drag force or brake torque is determined by the fact that when a threshold limit is reached the force of a spring is overcome and the frictional surfaces are first separated and then rapidly engaged in a sequence which can be described as a form of "stick-slip" restraint. Should such a drag device be chosen, it is appropriate to provide some further arrangement by which the necessity of continuous operation of the contact type drag device is avoided, so that the drag device is put into operation only when threshold limit values for retardation and acceleration are exceeded. This may be accomplished by adding some type of device which normally keeps the frictional surfaces apart and allows the drag device to be put into action when there is risk that signalling by the sensor may be required. When a sensor in accordance with this invention is installed in an automotive vehicle, such control may be by mechanical manipulation from the brake pedal for the vehicle, by an electrical solenoid operated under the control of an electrical switch responsive to brake pedal movement or to hydraulic pressure, or directly by brake fluid pressure such as hydraulic or pneumatic pressure.

In addition to contact type or frictional drag devices or brakes, it is contemplated that a wide variety of other drag devices are useful in sensors according to the present invention, including non-contact devices such as eddy current couplings, magnetic hysteresis couplings, viscous couplings of various types, and dynamoelectric devices. Several among these types of devices make it possible to control torque exerted in a simple way, by controlling intensities of electrical currents or levels of electrical power, opening possibilities for adapting the characteristics of a sensor to vehicle operating conditions as described more fully hereinafter. As used in the present invention, such drag devices are capable of at least approaching exerting a brake torque which is independent of absolute rotational speed.

Where dynamoelectric devices are used, such devices may be selected from a class of direct current machines or from a class of alternating current machines. Where a direct current machine of so called drum or disc type is selected, such a device is distinguished in that the rotor or armature thereof lacks any ferromagnetic mass, resulting in a rotor which has a very small moment of inertia and no eddy current losses. The latter characteristic contributes to independence of braking torque from rotational speed. While such a direct current dynamoelectric drag device may in some instances be preferable, any deviation from absolute rotational speed independence of brake torque with a more "normal" direct current machine is so small as to lack practical importance in the present invention.

Direct current generators are provided with commutators and brushes which are subject to wear during operation and hence may limit the operating life of a sensor incorporating such a dynamoelectric drag device. In order to avoid this difficulty, it is contemplated that an alternating current generator may be employed which has been constructed with a rotor of permanent magnetic material. Current generated by such alternating current dynamoelectric drag device may be rectified by a number of diodes in a manner similar to the circuits used with alternators in automotive vehicles.

Figure 4:
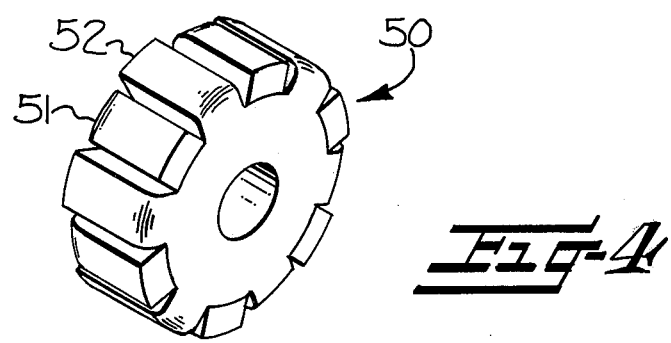
FIG. 4 is an assembled perspective view of the elements of FIG. 3.
Figure 5:
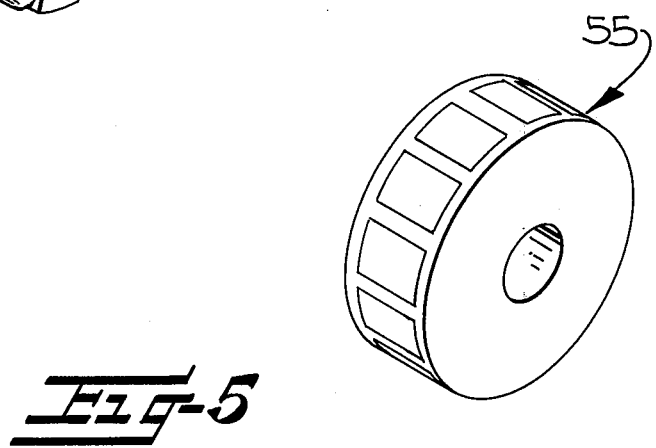
FIG. 5 is a view similar to FIG. 4, showing an alternative rotor element.

FIGS. 3 through 5 illustrate certain approaches to the manufacture of permanently magnetized rotors. One type of rotor is generally indicated at 50 in FIGS. 3 and 4, and is constructed by providing two oppositely directed symmetrical pole pieces 51, 52 formed of flat circular parts from which a number of fingers project. As assembled, the fingers on the pole pieces 51, 52 are interleaved one with another (FIG. 4). A magnetic field source 54, illustrated as being an annular permanent magnet, is mounted between the pole piece members 51, 52. The magnet member 54 is constructed to have one flat end thereof a south pole and the other flat end thereof a north pole. As will be appreciated, the magnetizing component 54 may, alternatively, take the form of a wound coil supplied with electrical current through a slip ring arrangement.

An alternative rotor generally indicated at 55 in FIG. 5 may be formed of a suitable permanently magnetizable material, preferably of a sintered particle type, cast with an appropriate bonding material and magnetized in such a way that the circumferential face thereof has a plurality of poles spaced circumferentially thereabout of alternating north and south characteristics.

One distinction between certain classes of drag devices as described to this point arises from the exertion or non-exertion of a torque on the return springs 31, 131 when the wheel from which the drive or input shafts 11, 111 are driven stands still or is stationary. More particularly, certain of the brake or drag devices described hereinabove are of such a structure that no torque is generated at standstill. Where no torque is generated at standstill, false signals can be generated unless control arrangements are employed which are capable of distinguishing these circumstances. Dynamoelectric non-contact drag devices open a simple way for such an arrangement by current generated by the drag device to supply a signal voltage so that when the sensor is at standstill there is no signal voltage available. Other approaches to these operating characteristics of sensors in accordance with the present invention will be described more fully hereinafter.

Exertion of selected torques or drags at any rotational speed may be accomplished, with certain dynamoelectric drag devices, by opposing the current generated by the device with an independent current derived from another source and tending to operate the device as a motor. Normally however, a requirement that a sensor be able to signal at very low rotational speeds is more readily met through using a type of drag device other than a dynamoelectric device, particularly devides of hysteresis or magnetic powder types. While these two types of devices are generally well known to persons skilled in the applicable arts, it may be useful here to briefly review certain characteristics of those devices.

Similarly to dynamoelectric and eddy current devices, magnetic powder and hysteresis effect drag devices have stators and rotors. The stator may be a rotationally symmetrical member of iron having an inner cylindrical coupling surface. The rotor may also be formed, at least in part, by a rotationally symetrical iron member rotatably mounted relative to the stator and having an outer cylindrical coupling surface which turns with a relatively small gap or spacing with regard to the coupling surface of the stator. A magnetic field generating component, such as a solenoid or electrical winding, is arranged so that the stator and rotor provide opposite poles, such as where the stator provides a south pole and the rotor a north pole. The gap between the stator and the rotor may be filled by magnetic particles or powder (if so desired) in which case the device is of a magnetic powder type. Under the influence of the magnetic field in the gap between the rotor and stator, the magnetic powder will coalesce and resist relative turning motion between the rotor and the stator, with the magnitude of the resistance being dependent upon the dimensions and proportions of the device and the quantity of magnetic powder employed. For any certain drag device, the magnitude of the resistance to turning movement is directly proportional to field strength, or to the current applied to any electrical winding or solenoid. The torque is essentially independent of rotational speed. A magnetic powder drag device can provide large torques from a device of relatively small size and with low current consumption, but suffers from a possible deficiency in that the device is subject to wear and deterioration of the magnetic powder.

In a magnetic hysteresis drag device, the rotor is generally provided by a drum or flat disc of magnetizable material. Such devices are well known and, in at least certain forms, are available from manufacturers known to persons skilled in the art. In a device of the magnetic hysteresis drum type, the drum may have only one end wall, to which a shaft is mounted concentrically with an outer surface of the drum. A stator may be provided by an outer and an inner part, each concentric with the rotor shaft and drum. A central opening through the inner part of the stator may receive the shaft of the drum and accommodate bearings fo the shaft. Any winding or other magnetic field generating device used is so arranged that one of the stator parts has a number of magnetic poles and the other has a like number of opposite magnetic poles, with the rotor being positioned in two magnetic fields in such a way that the material of the rotor is magnetized in a particular pattern and, during relative movement, the pattern of magnetization must be displaced in the mass of the rotor. Such continuous change in a magnetic field causes a loss, referred to as "hysteresis loss", which results in the exertion of a torque.

In the drag devices described, the torque exerted is independent of rotational speed and will have the same magnitude at standstill or at any rotational speed. Losses in addition to air resistance and bearing losses, which are so small as to be neglectable, essentially amount only to an unavoidable eddy current loss. Suitable structural design for such a drag device as a total unit and material choice for the components may maintain any non-linear part of the total torque exerted below one percent of total torque. Generally speaking, torque is proportional to stator magnetization, and thus directly proportional to current intensity.

In accordance with this invention, it is preferred that both magnetic powder and magnetic hysteresis devices be supplied with electrical current through a temperature compensated constant current circuit in order that the torque exerted may be maintained at the controlled levels notwithstanding varying temperatures of the windings used, as the resistance of the windings may vary in connection with such varying temperatures. A constant current circuit may also be necessitated by the current supply, such as an automotive vehicle electrical system, not being able to maintain a constant voltage.

Sensors for responding to rates of change of changing rotational speeds of rotating members such as automotive vehicle wheels have been disclosed heretofore which react to an "initial" rate by decoupling a flyweight and originating a sensor signal, and thereafter changes to a "memory" rate until such time as braking system operation restores a particular relationship between wheel speed and flyweight speed. Interested readers are referred to more extensive discussions of this characteristic of sensor operation to be found in prior publications such as U.S. Pat. No. 4,061,212 which is hereby incorporated by reference to any extent necessary to a full understanding of this invention. Sensors in accordance with the present invention differ from certain of the sensors described heretofore by providing unprecedented flexibility in selecting relationships between "initial" and "memory" settings. More particularly, the drag devices employed, and most specifically the electrically controlled non-contact type drag devices, open significant possibilities for changing torques exerted in response to sensor operation. That is, while the sensors described hereinabove with particular reference to FIGS. 1 and 2 function with a single level of applied torque (be that by a contact or non-contact type drag device), there is no specific requirement that the torque exerted by the drag device 26,126 and establishing a rate of retardation or slowing for the flyweight 10,110 be the same during both coupled and decoupled rotation of the flyweight. Instead, and as particularly contemplated for the sensor of this invention, the braking or drag torque exerted may change.

Where a constant drag torque is exerted by the drag device 26, 126 on the flyweight 10, 110, the initial and memory settings for a sensor are identical. Upon a threshold value for retardation or deceleration being reached, the driving torque transmitted through the freewheel or one way clutch 24, 124 is released from the flyweight, the control spring 31, 131 causes a sensor signal to appear, and the flyweight decelerates at a rate set by the threshold value established by the torque exerted by the drag device. However, where the operation of the drag device is modified in accordance with the present invention and as described more fully hereinafter, the torque exerted by the drag device 26, 126 is switched between two levels which may be related one to another in any desired manner. An initial drag torque level establishes the threshold value or rate of retardation of a vehicle wheel at which decoupling occurs, while a second or memory torque establishes the rate of retardation of the decoupled flyweight.

Figure 6:
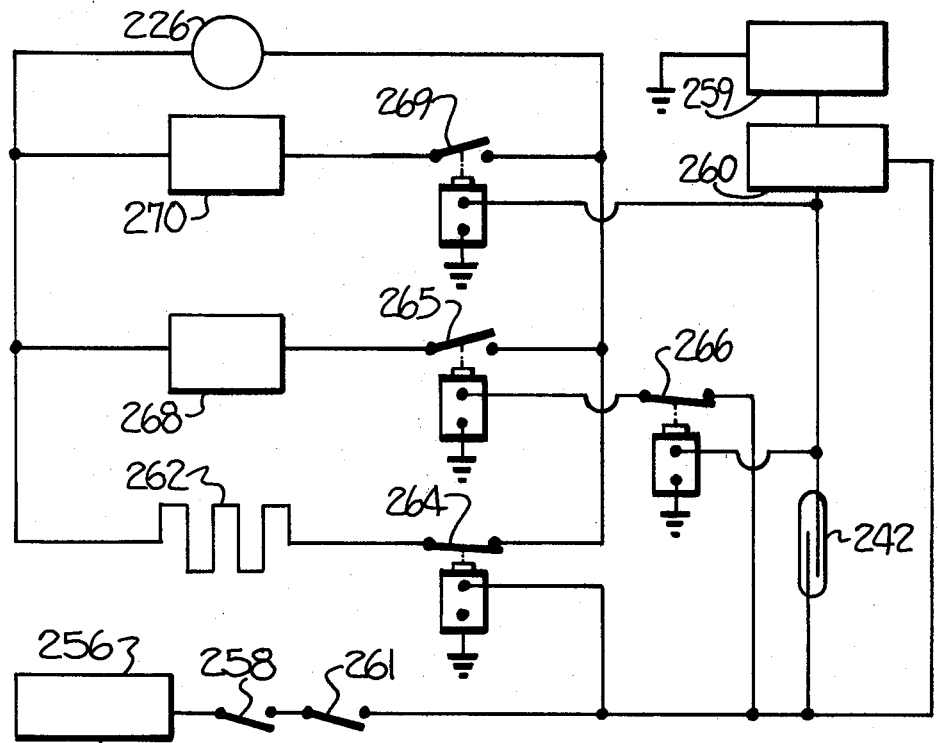
FIG. 6 is a schematic diagram of electrical circuitry which may be employed with the sensors of FIGS. 1 and 2 in order to provide particular control characteristics for the operation of such sensors.

A circuit arrangement accomplishing operation for the sensors of FIGS. 1 and 2 along the lines described hereinabove, and particularly where the drag device employed is of a dynamoelectric non-contact type, is illustrated in FIG. 6, where components corresponding to the components identified above the reference to FIGS. 1 and 2 have been identified by comparable reference characters of a 200 order. As there shown, a sensor switch 242 is opened and closed in response to coupled and decoupled rotation of a sensor flyweight and cooperates with electrical circuit elements now to be described in governing the torque exerted by a drag device 226. Electrical power for the circuitry illustrated is derived from a main power supply 256 through a main switch 258 which may be an ignition switch for an automotive vehicle. Signals originating from the sensor switch 242 ultimately are supplied to a brake force modulator 259 through a signal amplifier 260, in order to control the rate of retardation or the braking of a vehicle wheel or the like.

In order to assure that drag or braking torque is exerted on the flyweight only as is required, electrical current reaches the circuitry shown from the power supply 256 and ignition switch 258 only with closure of a pressure responsive switch 261 which may be, for example, the brake light switch of an automotive vehicle. Thus, upon a vehicle operator stepping on and applying force to a brake petal, electrical current is supplied to the circuitry shown in such a manner as to accomplish control over the brake force modulator 259. This use of the brake light switch 261 accomplishes two functions; namely to avoid false signals under circumstances where brakes are not being applied and secondly to relieve the sensor and its internal drive train from unnecessary wear and tear. More specifically, the sensors of the present invention are constantly subjected to a drag or braking torque by the devices 26, 126 during braking. By exerting the control drag torques only during actual braking events, wear is minimized.

By means of a resistance 262 and a relay generally indicated at 264, the dynamoelectric drag device 226 is normally self-excited at very low current levels to impose a torque only sufficient to force the flyweight to follow wheel speed changes under normal driving conditions. Upon the brake light switch 261 closing, the relay 264 disconnects the resistance 262 from the dynamoelectric drag device 226. At the same time, the normally open contacts of an initial relay 265 are closed upon energization of the winding or coil of the initial relay 265 through a normally closed contact set of a memory relay 266. The initial relay 265 then connects the drag device 226 to draw a first level of electrical current therefrom through an initial constant current circuit 268.

Subsequently, in the event that the rate of retardation of a braked member exceeds a threshold rate, the sensor switch 242 changes conductive state as briefly described hereinabove. With a change in conductive state, the winding or coil of the relay 266 controlling the normally closed contact set through which the initial relay 265 was energized is energized through the sensor switch 242, opening the normally closed contact set and blocking further delivery of current through the initial constant current circuit 268. At the same time, the winding of a memory relay generally indicated at 269 is energized, closing an associated normally open contact set and short circuiting the drag device 226 through a memory constant current circuit 270.

Figure 7:
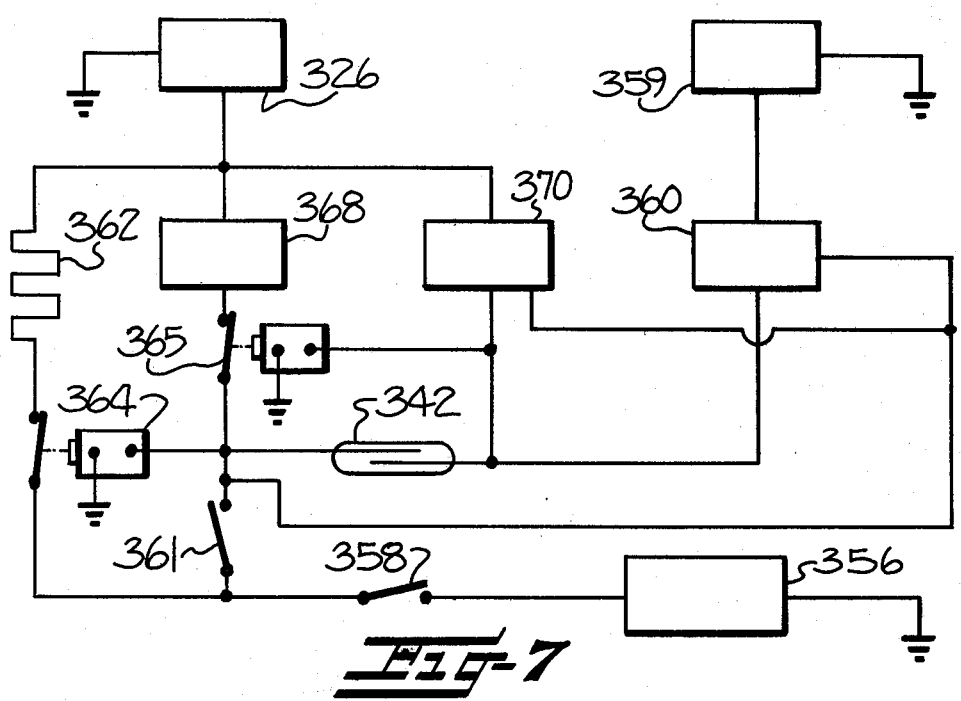
FIG. 7 is a view similar to FIG. 6 of an alternative form of circuitry.

Just as dynamoelectric non-contact type drag devices may have individually controlled initial and memory torques, so may magnetic hysteresis or magnetic powder drag devices. Circuitry generally similar to that of FIG. 6 and functioning with such magnetic hysteresis or magnetic powder devices is illustrated in FIG. 7, where reference characters comparable to those used in FIG. 6 have been employed in a 300 series. The difference between the circuitry of FIGS. 6 and 7 lies in the characteristic of dynamoelectric devices as generating a current supply. With magnetic hysteresis or magnetic powder devices which do not generate currents, provision is made for normally delivering electrical current through the resistance 362 so as to establish the minimum level of torque necessary to assure that the cooperating flyweight follows changes in wheel speed. As will be appreciated, the magnetic field generating winding or coil of the drag device 326 is supplied with electrical current through an initial constant current circuit 368 and a memory constant current circuit 370 in a manner generally similar to that described hereinabove.

As will be appreciated, the solution for any possible problem with false signalling embodied in the circuits of FIGS. 6 and 7, namely supplying electrical current to the sensor switch 242, 342 through the brake light switch 261, 361, is equally as well adaptable to contact type drag devices as described hereinabove and which are susceptible to generating sensor signals while at rest.

As is known to persons skilled in the art of braking systems having sensors and modulators, the so-called g-value of a sensor as related to its use in brake control systems for vehicles is defined with reference to the vehicle speed change which causes an alteration in the rotational speed of a flyweight. High retardation values are stated to correspond to high g-values. Normal g-value settings for sensors included in vehicle brake control systems are between 0.7 and 1.5 g, where the average figure for the acceleration of objects in the gravitational field of the earth, namely 9.81 m/sec$^2$, is used as a reference. The meaning of the term "g-value" may also be understood from graphical representations of vehicle speed, flyweight speed, and vehicle wheel speed to be found in prior publications. In such graphs, the slopes of lines indicating speeds, or the negative derivatives thereof, are measures of retardation expressed in appropriate units.

Figure 8:
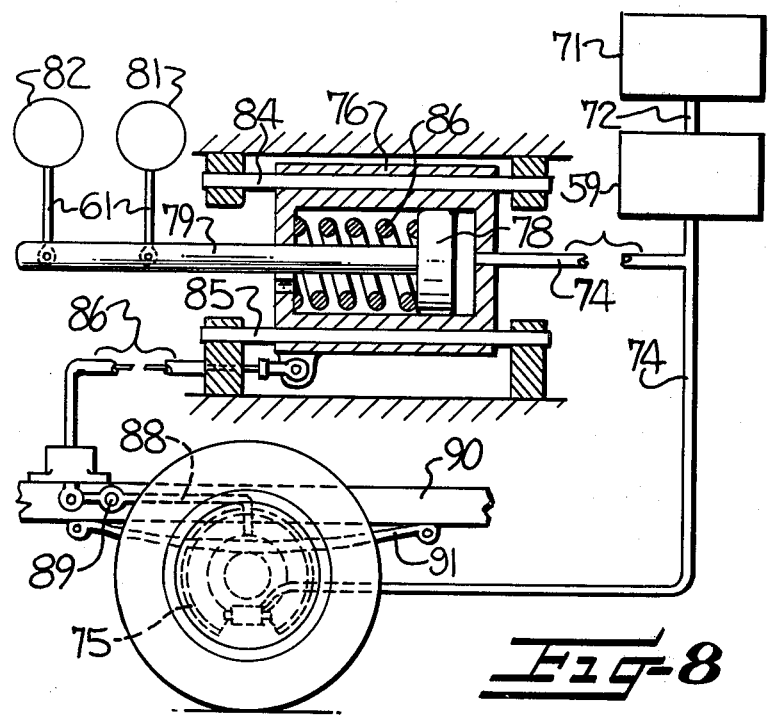
FIG. 8 is a schematic view, partly in elevation and partly in section, of an arrangement by which the parameters of operation of the sensors of FIGS. 1 and 2 may be accommodated to vehicle operating conditions.
Figure 9:
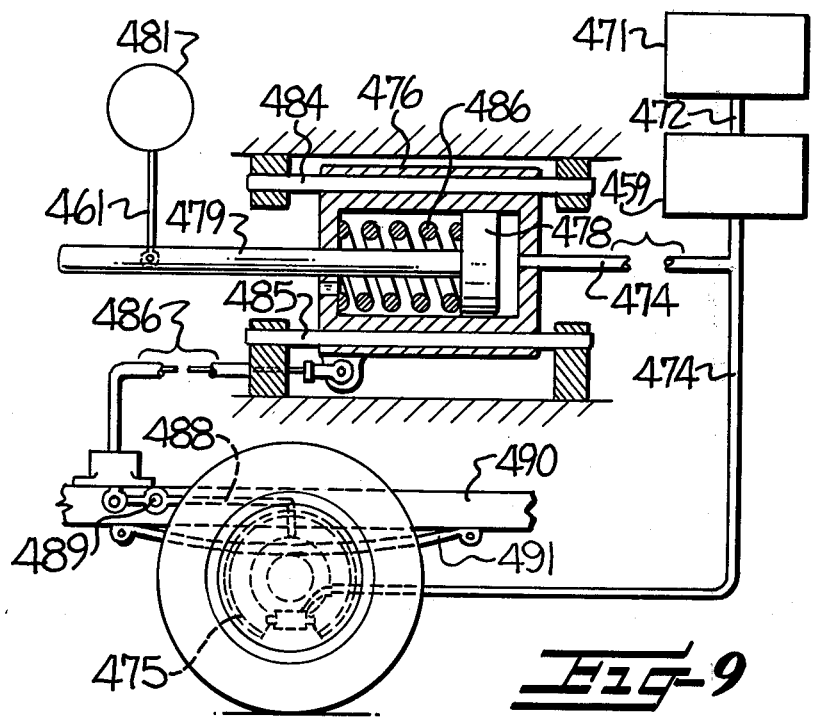
FIG. 9 is a view similar to FIG. 8, showing another arrangement by which the parameters of operation of sensors employed with circuitry as in FIGS. 7 and 8 may be accommodated to vehicle operating conditions.

Frictional conditions existing between a wheel and a road surface are one of two important varying factors which, in accordance with the present invention, may have influence on the g-valve settings of sensors for a particular vehicle. The second factor is vehicle loading, and FIGS. 8 and 9 illustrate two arrangements in which the two variables can affect the adjustment of a sensor. More particularly, FIG. 8 includes a schematic representation of a source 71 of a pressurized braking fluid, such as a master cylinder supplying pressurized hydraulic oil, and a brake force modulator 59 for controlling vehicle wheel braking effects. An appropriate conduit 72 connects the pressure source 71 with the modulator 59 and a further conduit 74 supplies pressurized braking fluid to a vehicle wheel brake 75. Pressure supplied from the master cylinder 71, whether or not modulated or reduced by the effect of the modulator 59, is supplied through the conduit 72 to a cylinder 76 enclosing a piston 78 which operates a piston rod 79 and is acted on by a spring 86. The position of the rod 79 controls, through pins 61, electrical circuit elements of the constant current circuits 268, 270, 368, 370 which may, for example, be potentiometers 81, 82. The cylinder 76 is arranged to slide axially along two guides 84, 85. Further, the cylinder 76 is operatively connected with a Bowden wire 86, the other end of which is connected to a lever 88 mounted for movement about a pivot 89, fixed in the frame 90 of the vehicle, in response to relative displacement of the vehicle frame 90 and the vehicle suspension 91. As vehicle load increases, the vehicle suspension moves relative to the frame, causing movement to be transmitted through the lever 88 and Bowden wire 86 to the cylinder 76.

When the brakes are not actuated and no pressure is transmitted from the master cylinder 71 through the modulator 59 to the brake cylinder 75 of the vehicle wheel and the control cylinder 76, the return spring 80 urges the piston 78 to the right in FIG. 8, with the piston rod 79 thus keeping the potentiometers 81, 82 positioned for a low g-value setting at which low current is drawn from or applied to the drag device. When the master cylinder 71 is actuated, braking fluid pressure rises in the cylinder 76, the force applied to the piston 78 overcomes the force of the return spring 86, and the piston 78 and rod 79 are moved (to the left of FIG. 8). As a consequence, the pins 61 of the potentiometers 81, 82 are turned in such a way as to raise the g-value settings of the sensor.

At an increased brake fluid pressure, a point may be reached at which the vehicle wheel tends to lock, the flyweight decouples, and the sensor generates a signal to the modulator to lower brake pressure. The brake pressure at which the sensor starts to signal is a measure of the frictional conditions existing between the wheel and the road surface and the system, as here described, has thus adjusted the sensor to a g-value setting suitable for the existing conditions.

Compensation of g-value settings solely in response to braking fluid pressures will be found, in some circumstances, to be sufficient for vehicles such as heavy passenger cars in which wheel pressure does not vary greatly in response to vehicle loading. However, with cargo trucks and small cars of relatively low weight, wheel pressures may vary considerably in response to vehicle load. It is with such vehicles that the efficiency and versatility of a brake control system is substantially enhanced by using both vehicle load conditions and hydraulic braking fluid pressures as control parameters for g-value settings. In such instances and in the arrangement illustrated in FIG. 8, it is correct to say that the load dependent g-value adjustment is superposed on the fluid pressure dependent g-value adjustment.

Brake force modulating systems have been proposed for compressed air brake systems in which air pressure is not modulated but a hydraulic system is provided to oppose or counteract the brake force exerted by the "normal" compressed air brake system. The present invention is contemplated as being adaptable to such arrangements, with it being understood that in such arrangements the cylinder 76, piston 78, piston rod 79 and return spring 80 may be replaced by a differential pressure cylinder arrangement in which the piston is balanced between the total air pressure applied to a wheel cylinder and the counteracting hydraulic fluid pressure. In the event that the pressure ranges for the air and hydraulic fluid are of different magnitudes, the cylinder arrangement may employ two interconnected pistons of different diameters in order to accommodate the balancing effect. Normally, the "counteracting" hydraulic fluid pressure would be contemplated as being higher than the "normal" air brake pressure and, for that reason, the piston responding to air brake pressure may be the larger one.

The arrangement of FIG. 8, described above, accomplished variation of both initial and memory g-value settings. However, it is contemplated that only one of the settings (typically the initial setting) may be modified by the varying factors described above. Such an arrangement is illustrated in FIG. 9, where reference characters comparable to those of FIG. 8 but of a 400 order series have been employed. As would be noted, only a single potentiometer 481 is provided, with the memory constant current circuit being arranged to provide a current which is not automatically modified with changes in vehicle operating conditions.

It is contemplated that the use of constant current circuits may be avoided with certain specific structures in accordance with this invention where control of g-value settings is accomplished somewhat differently. A sensor shown in FIGS. 10 and 11, and now to be described, is an example of such a simplification of certain characteristics of this invention. Where components common to the sensors described above with reference to FIGS. 1 and 2 are shown, common reference characters of a 500 order series have been applied to elements shown in FIGS. 10 and 11.

Figure 10:
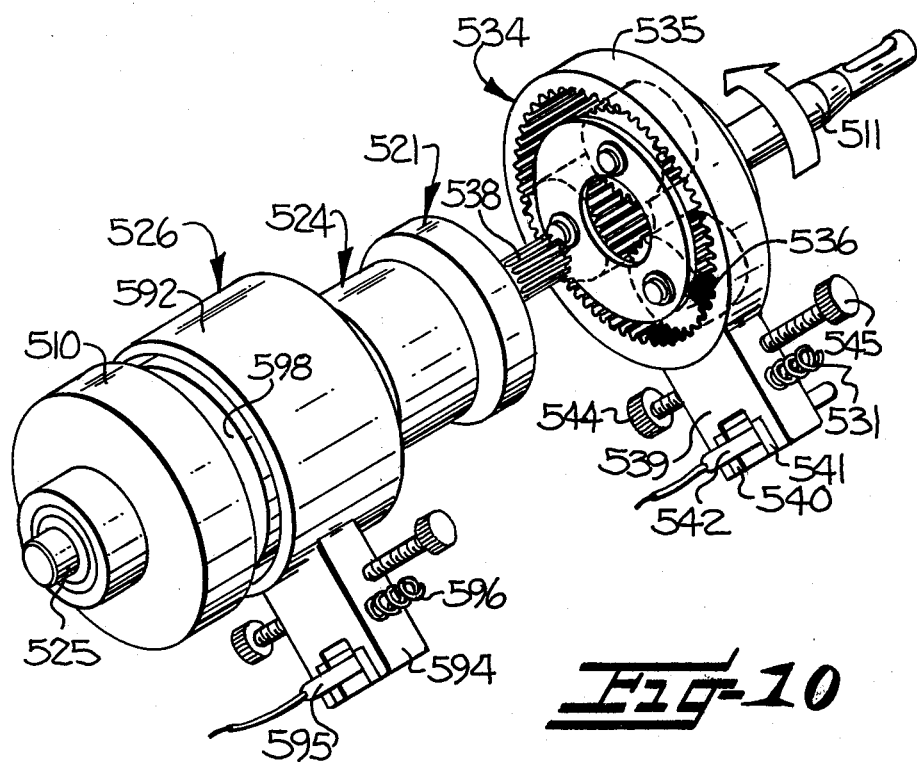
FIG. 10 is a view similar to FIGS. 1 and 2 showing one particular embodiment of a sensor in accordance with this invention and using an electrically controllable drag device.
Figure 11:
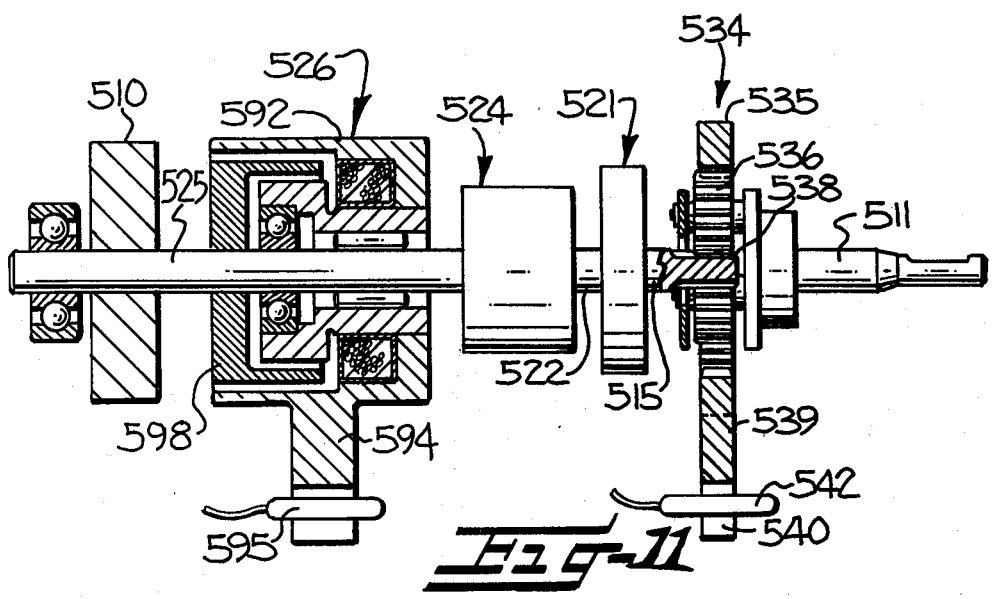
FIG. 11 is an elevation view, partly in section, of the sensor of FIG. 10.

The sensor of FIGS. 10 and 11 operates substantially the same as the sensors of FIGS. 1 and 2, signalling with a change in conductive state of a switch 542. The differences between the sensor of FIGS. 10 and 11 and those of FIGS. 1 and 2 relate to the way in which the torque exerted by the drag device 526 on the flyweight 510 and related components is controlled. More particularly, the torque exerted is an average of a plurality of (usually two) torques exerted in a rapidly alternating or fluctuating series or cycle. Alternation or fluctuation of the torque exerted is controlled by a drag device stator 592 which has a projecting magnet carrier 594 constructed similarly to the orbit gear magnet carrier 539 and similarly cooperating with a magnetically actuable switch 595.

In the form shown, the drag device is a hysteresis or magnetic particle device which, for present purposes, operates similarly to a dynamoelectric device. With any such device, when current is applied to or drawn from the device, the drag or brake torque exerted relative to the stator 592 will, upon rotation of the drag device rotor 598, overcome the force of the spring 596 acting against the stator magnet carrier 594 and turn the magnet carrier sufficiently to cause the conductive state of the associated switch 595 to change. By an appropriate electrical connection, the torque exerted by the drag device 526 is decreased immediately upon such change in the conductive state of the drag device switch 595 and the magnet carrier 594 is moved by the force exerted by the spring 596. By a rapid fluctuation of the drag device switch 595 between conductive and non-conductive states, the torque exerted by the drag device 526 and thus the g-value setting of the sensor is controlled without necessity of providing constant current circuitry. Normally, the initial and memory g-value setting of the sensor of FIGS. 10 and 11 are the same, as described above, but persons skilled in the applicable arts and knowing of this invention will recognize that variation between such settings may be accomplished in appropriate ways.

Inasmuch as the g-value setting of the sensor FIGS. 10 and 11 is determined by the force exerted by the spring 596 acting on the stator magnet carrier 594, the arrangements described above with reference to FIGS. 8 and 9 may be modified by providing for variation in spring force with variation in vehicle conditions. Such a modified arrangement is illustrated at FIG. 12, where elements common to those described above have also been identified by common reference characters of a 500 order series.

Where the drag device chosen is a dynamoelectric device, the self-governing action described with reference to FIGS. 10 and 11 frees the designer to select drag devices which need not be manufactured to closely held tolerances, thereby simplifying practical applications of this invention.

The choice of a dynamoelectric device for the drag device 26, 126, 526 of the sensors of this invention provides a further advantage in avoiding possible false signals or loss of braking when a vehicle wheel is stationary or at standstill. A dynamoelectric drag device may be connected to provide current for sensor signalling, so as to avoid undesirable modulator operation when the braked vehicle wheel is not rotating. Such current, from a device operating as described with reference to FIGS. 10 and 11, is a "chopped" or pulsating current which must be smoothed by an appropriate circuit or circuit element. Where some other electrically controllable drag device such as a hysteresis or magnetic particle device is chosen, a similar safety arrangement may be achieved by providing either a small dynamoelectric device functioning only as a generator of signal current through the sensor switch and not as the drag device described above, or a miniature transformer or induction coil with a primary winding through which a fluctuating current supplied to the drag device passes and a secondary winding from which a "chopped" or pulsating current is taken to be smoothed and supplied for sensor signalling. Any small generator used must be driven from the shaft 25, 125, 525 driven from the freewheel device 24, 124, 524.

One practical operating embodiment of a sensor in accordance with the present invention has been illustrated in FIG. 13, where components common to the sensors described above have been identified by common reference characters of a six hundred order series. The sensor there shown specifically includes a dynamoelectric drag device. Further, provision is made for varying the spring force acting against the stator magnet carrier 694 with variation in vehicle conditions, as described hereinabove.

In the drawings and specification, there has been set forth a preferred embodiment of the invention, and although specific terms are employed, they are used in a generic and descriptive sense only and not for purposes of limitation.

That which is claimed is:

1. In a sensor for responding to the rate of change or changing rotational speeds of a vehicle wheel and including a flyweight coupleable for rotation in response to wheel rotation and selectively decoupleable in response to the exertion on the flyweight of a torque arising due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said control means comprising means for constantly exerting a torque on the flyweight and thereby for causing said signalling means to signal continuously for the interval of time during which the rate of change is excessive.

2. A sensor according to claim 1 wherein said control means comprises a non-contact drag device.

3. A sensor according to claim 1 wherein said control means comprises an electrically controllable drag device and further wherein said means for constantly exerting torque comprises electrical circuit means electrically connected to said drag device and responsive to said signalling means for switching between first and second electrical currents corresponding respectively to first and second levels of torque.

4. A sensor according to claim 3 wherein said drag device is a magnetic hysteresis brake.

5. A sensor according to claim 3 wherein said drag device is a magnetic powder brake.

6. A sensor according to claim 3 wherein said drag device is a dynamoelectric device.

7. A sensor according to one of claims 4, 5 and 6 wherein said electrical circuit means comprises current regulating means for subjecting said drag device to regulated, substantially constant first and second currents.

8. A sensor according to claim 3 wherein said electrical circuit means comprises adjustable means for selectively varying at least one of the first and second currents and thereby for selectively varying the g-value setting of the sensor.

9. A sensor according to claim 8 wherein said adjustable means comprises means for operatively responding to vehicle operating conditions by selectively varying at least one current in accordance with variations in vehicle operating conditions.

10. A sensor according to claim 9 wherein said means responsive to vehicle operating conditions is responsive to brake fluid pressure.

11. A sensor according to claim 9 wherein said means responsive to vehicle operating conditions is responsive to vehicle load.

12. A sensor according to claim 9 wherein said means responsive to vehicle operating conditions is responsive to both brake fluid pressure and vehicle load.

13. A sensor according to claim 1 wherein said control means comprises a contact drag device.

14. In a sensor for responding to the rate of change of changing rotational speeds of a vehicle wheel and including a flyweight coupleable for rotation in response to wheel rotation and selectively decoupleable in response to the exertion on the flyweight of a torque arising due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said control means comprising electrically controllable drag means for exerting a torque on the flyweight substantially continuously during braking and thereby for causing said signalling means to signal continuously for the interval of time during which the rate of change is excessive.

15. A sensor according to claim 14 wherein said drag means comprises rotor means mounted for rotation with said flyweight, and stator means encircling said rotor means and operatively coupled therewith for exertion of torque therebetween.

16. A sensor according to claim 15 wherein said stator means is mounted for limited rotational movement and further comprising electrical switch means operable in response to rotational movement of said stator means and electrically connected for controlling torque exerted by said drag means.

17. In a sensor for responding to the rate of change of changing rotational speeds of a vehicle wheel and including a flyweight coupleable for rotation in response to wheel rotation and selectively decoupleable in response to the exertion on the flyweight of a torque arising due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, and improvement in said control means comprising dynamoelectric drag means for exerting a torque on the flyweight substantially continuously during braking and thereby for causing said signalling means to signal continuously for the interval of time during which the rate of change is excessive.

18. A sensor according to claim 17 wherein said dynamoelectric means is electrically connected for generating signalling current for said signalling means.

19. In a braking system for a vehicle wheel and having anti-lock control means; and sensor means for actuating the anti-lock means including a flyweight coupleable for rotation in response to wheel rotation, freewheel means operatively interconnecting the flyweight and the wheel for selectively decoupling the flyweight from the wheel upon a torque being exerted therebetween due to a change in rotational speed of the wheel, and control means for exerting on the flyweight a torque resisting decoupled rotation of the flyweight, the improvement in said control means comprising means operable independently of said freewheel means for constantly exerting a torque of at least a predetermined magnitude on the flyweight during braking of the wheel.

20. A system according to claim 19 wherein said control means comprises a non-contact drag device.

21. In a braking system for a vehicle wheel and having anti-lock control means; and sensor means for actuating the anti-lock means including a flyweight coupleable for rotation in response to wheel rotation, means operatively interconnecting the flyweight and the wheel for selectively decoupling the flyweight from the wheel upon a torque being exerted therebetween due to a change in rotational speed of the wheel, and on electrically controllable drag device for exerting on the flyweight a torque resisting decoupled rotation of the flyweight, the improvement in said control means comprising means for constantly exerting a torque of at least a predetermined magnitude on the flyweight during braking of the wheel and including electrical circuit means electrically connected to said drag device and responsive to decoupled rotation of said flyweight for switching between first and second electrical currents corresponding respectively to first and second magnitudes of torque.

22. A system according to claim 21 wherein said drag device is a magnetic hysteresis brake.

23. A system according to claim 21 wherein said drag device is a magnetic powder brake.

24. A system according to claim 21 wherein said drag device is a dynamoelectric device.

25. A system according to claim 21 wherein said electrical circuit means comprises current regulating means for subjecting said drag device to regulated, substantially constant first and second currents.

26. A system according to one of claims 21 and 25 wherein said electrical circuit means comprises adjustable means for selectively varying at least one of the first and second currents and thereby for selectively varying the g-value setting of the sensor.

27. A system according to claim 26 wherein said adjustable means comprises means for operatively responding to vehicle operating conditions by selectively varying at least one current in accordance with variations in vehicle operating conditions.

28. A system according to claim 27 wherein said means responsive to vehicle operating conditions is responsive to brake fluid pressure.

29. A system according to claim 27 wherein said means responsive to vehicle operating conditions is reponsive to vehicle load.

30. A system according to claim 27 wherein said means responsive to vehicle operating condition is reponsive to both brake fluid pressure and vehicle load.

31. A system according to claim 21 wherein said control means comprises a contact drag device.

* * * * *

UNITED STATES PATENT AND TRADEMARK OFFICE
CERTIFICATE OF CORRECTION

PATENT NO. : 4,235,316
DATED : November 25, 1980
INVENTOR(S) : Folke I. Blomberg It is certified that error appears in the above-identified patent and that said Letters Patent are hereby corrected as shown below:

Column 1, line 15, "rotation" should be --rotating--
Column 4, line 47 after "136" delete "fomagnet" and insert --for driving them in rotation within the orbit gear 135. The orbit gear 135 is mounted to accommodate restricted angular movement and has a projecting magnet --
Column 6, line 44, after "such" insert --an--.
Column 8, line 9, "fo" should be --for--.

Claim 1, Column 14, line 13, "or" should be --of--.

Signed and Sealed this

Second Day of June 1981

[SEAL]

Attest:

RENE D. TEGTMEYER

Attesting Officer

Acting Commissioner of Patents and Trademarks